I. W. BURGESS.
BRAKE SHOE HEAD.
APPLICATION FILED JULY 6, 1911.

1,018,294.

Patented Feb. 20, 1912.

2 SHEETS—SHEET 1.

Witnesses
Hugh Hott
F. O. Pauleu

Inventor
Ira W. Burgess
By Victor J. Evans
Attorney

I. W. BURGESS.
BRAKE SHOE HEAD.
APPLICATION FILED JULY 6, 1911.
1,018,294.
Patented Feb. 20, 1912.
2 SHEETS—SHEET 2.
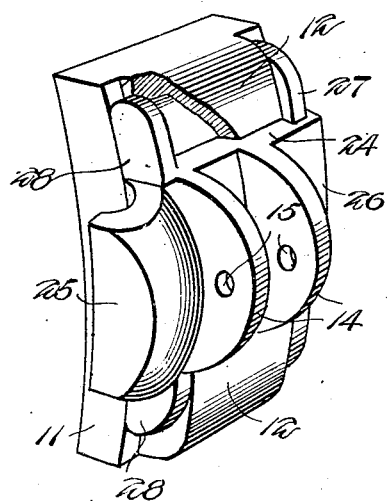
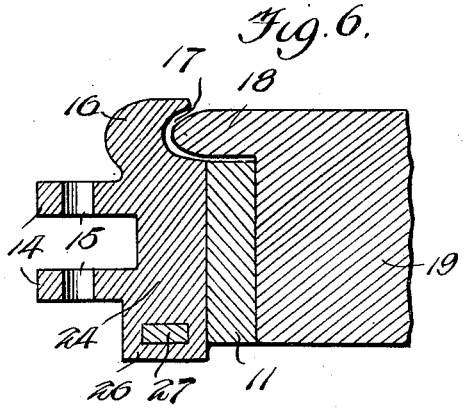
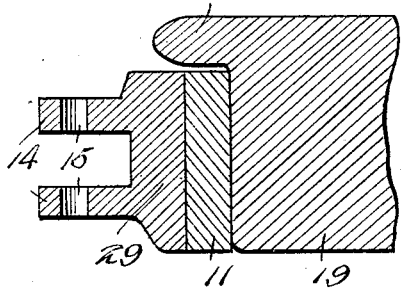
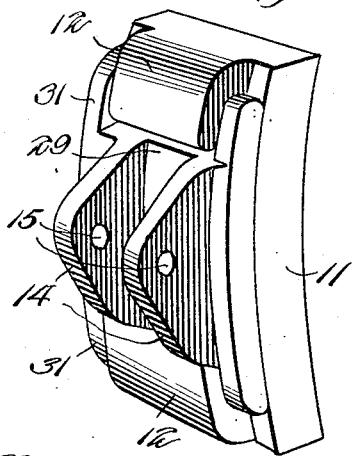
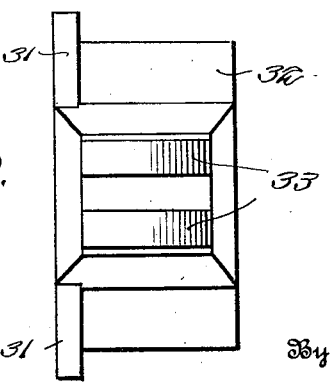
Inventor
Ira W. Burgess
By Victor J. Evans
Attorney
Witnesses

UNITED STATES PATENT OFFICE.

IRA W. BURGESS, OF MINDEN, WEST VIRGINIA, ASSIGNOR OF ONE-HALF TO JAMES HOWARD, OF MINDEN, WEST VIRGINIA.

BRAKE-SHOE HEAD.

1,018,294.  Specification of Letters Patent.  Patented Feb. 20, 1912.

Application filed July 6, 1911. Serial No. 637,110.

*To all whom it may concern:*

Be it known that I, IRA W. BURGESS, a citizen of the United States, residing at Minden, in the county of Fayette and State of West Virginia, have invented new and useful Improvements in Brake-Shoe Heads, of which the following is a specification.

The invention relates to brake heads, and more particularly to the class of brake shoe holders, especially adapted for use on railway cars or locomotives.

The primary object of the invention is the provision of a holder in which the shoe will be held therein by the coöperation of the flange of a car wheel, and an abutment upon the holder, so that there will be no possibility of the shoe working therefrom.

Another object of the invention is the provision of a brake shoe holder, in which the brake shoe may be mounted thereon or removed therefrom at either the flange side of the car wheel, or the opposite side thereof, and when mounted will be retained upon the holder, without possibility of the said shoe becoming accidentally detached.

A further object of the invention is the provision of a brake shoe holder which is simple in construction, possesses strength, durability, and that may be manufactured at a minimum cost.

With these and other objects in view, the invention consists in the construction, combination and arrangement of parts, as will be hereinafter more fully described, illustrated in the accompanying drawings, and pointed out in the claims hereunto appended.

Figure 1:
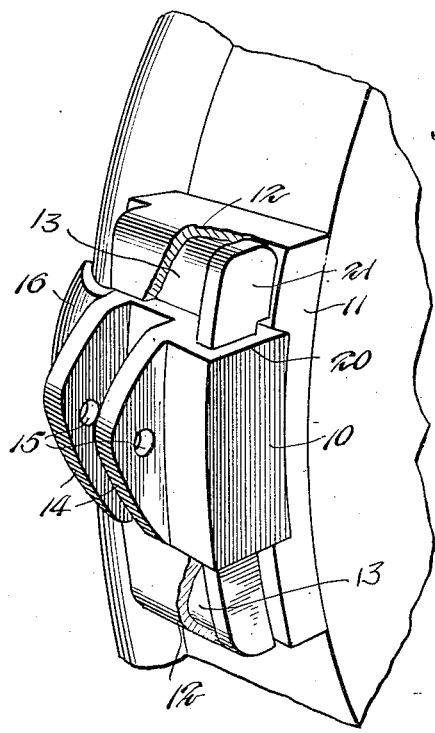
Figure 2:
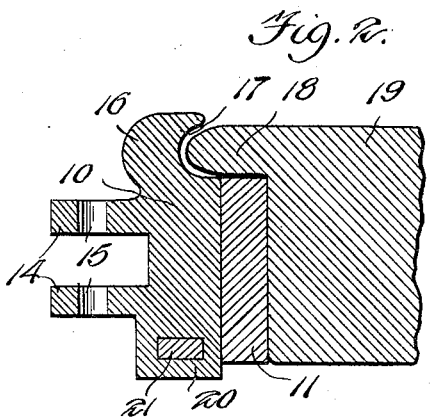
Figure 3:
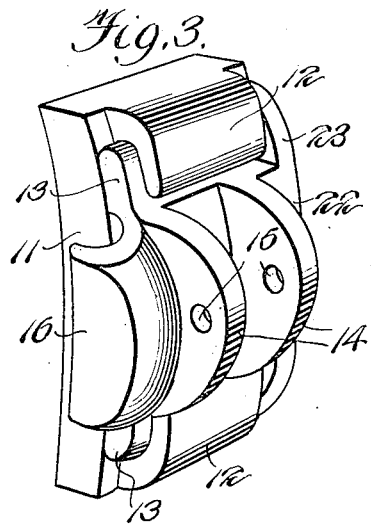
Figure 4:
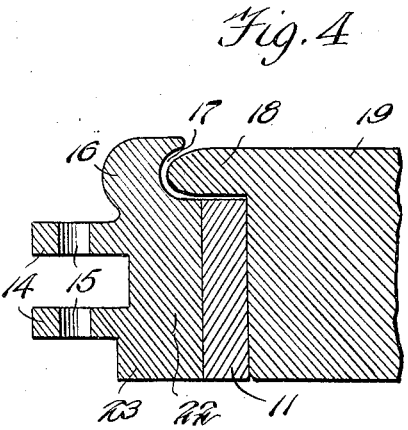

In the drawings: Figure 1 is a perspective view of a brake shoe holder, showing the brake shoe thereon and constructed in accordance with the invention. Fig. 2 is a horizontal transverse sectional view through the holder and brake shoe, showing a fragmentary portion of a car wheel in position relative thereto. Fig. 3 is a similar view to Fig. 1 of a modification of the holder. Fig. 4 is a horizontal transverse sectional view thereof. Fig. 5 is a view similar to Fig. 1, showing a further modification of the brake shoe holder. Fig. 6 is a horizontal transverse sectional view. Fig. 7 is a view similar to Fig. 1, showing a still further modification of brake shoe holder. Fig. 8 is a transverse sectional view of Fig. 7 looking upward. Fig. 9 is a rear elevation of a still further modification of brake shoe holder.

Similar reference characters indicate corresponding parts throughout the several views of the drawings.

Referring to the drawings by numerals, and especially Figs. 1 and 2 thereof, the brake shoe holder comprises a casting 10, forming a supporting head for the brake shoe 11, the latter being formed on its rear face at opposite ends with hook-like flanges 12 for locking engagement on extension lips 13 formed at the top and bottom face of the said head 10, the rear face of the latter being formed with spaced parallel vertically disposed ears 14 containing alining openings 15 for receiving a bolt member (not shown), for connecting the said head with the brake beam.

Formed at one side edge of the head 10 is a flange engaging enlargement 16, the same being channeled or grooved, as at 17, for receiving the flange portion 18 of a car wheel 19, the flange 18 of the latter being designed to form an abutment for the brake shoe 11 to prevent the lateral displacement thereof in one direction on the head. Formed on the opposite or remaining side edge of the head 10 is a key receiving housing 20, in which is inserted a removable locking key 21, the ends of which project exteriorly of the housing 20 and are adapted to serve as abutment extremities for the flanges 12 to prevent lateral displacement of the shoe 11 in a direction away from the flange 18 on the car wheel 19. It is of course understood that in placing the shoe upon the head 10, the key 21 is removed from the housing 20, and the said shoe 11 can be slipped upon the head from the outside of the car wheel, and upon retracting the head from the said car wheel and leaving the key 21 in the housing 20, the shoe may be slipped upon the head at the flanged side of the wheel, thus making it possible to mount the shoe upon the head from either side of the car wheel.

In Figs. 3 and 4 of the drawings, there is shown a slight modification of brake shoe holder, which comprises a head 22, at one longitudinal side edge of which is formed an abutment flange 23, against which the flanges 12 on the shoe 11 contact, the flange 23 being disposed relative to the wheel on the side opposite the flange 18 thereon, so that the said flange 18 will serve as an abutment for the shoe 11 on the opposite side thereof, thus preventing the shoe from becoming accidentally detached from the head.

In Figs. 5 and 6, there is shown a still further modification of the invention, wherein the head 24 is formed at one side thereof with a flange engaging enlargement 25 similar to the enlargement 16 shown in Figs. 1 and 2 in the drawings, while at the opposite side of the head is formed a key receiving housing 26, in which is inserted a key 27, the ends of which project exteriorly of the housing and form an abutment for the flanges 12 of the shoe 11, so as to prevent lateral displacement of the latter upon the head in one direction. Projecting outwardly from the opposite ends of the enlargement 25 are abutment shoulders 28, against which the opposite sides of the shoe 11 contact to prevent lateral displacement thereof toward the flange portion of the car wheel. It will be evident that the shoe, in this construction, can only be inserted upon the head 24 from the outside of the car wheel, and cannot be inserted on the head from the flange side of the car wheel.

In Figs. 7 and 8, there is shown a brake head similar to the brake head shown in Figs. 3 and 4 with the exception that the flange 16 is omitted. The head 29 is formed at one side thereof with an abutment flange 31, the latter being disposed on the side of the car wheel opposite the flange thereof, and against which contacts the shoe 11 at one side thereof, while the opposite side of the shoe abuts against the car wheel flange. In this construction, as in the construction shown in Fig. 3, it is evident that the shoe 11 can only be placed upon the head 29 from the flange side of the car wheel, it being understood of course that the head is retracted a slight distance from the periphery of the said car wheel, when the shoe is being mounted thereon.

In Fig. 9, there is shown a still further modification of the invention, wherein the head 32 is formed at its rear face with spaced parallel horizontally arranged ears 33 for the fastening of the head upon a horizontally movable brake beam.

What is claimed is:

1. A brake shoe holder, comprising a head having a concaved face, an abutment flange at one longitudinal side edge thereof, a grooved car wheel flange engaging enlargement at the opposite longitudinal side edge thereof, and a shoe removably fitted upon the head against the concaved face thereof and adapted to contact with the abutment flange at one side thereof and also with the flange of a car wheel at the opposite side thereof.

2. A brake shoe holder, comprising a head having a concaved face, an abutment flange at one longitudinal side edge thereof, a grooved car wheel flange engaging enlargement at the opposite longitudinal side edge thereof, a shoe removably fitted upon the head against the concaved face thereof and adapted to contact with the abutment flange at one side thereof and also with the flange of a car wheel at the opposite side thereof, and means on the shoe for holding it upon the head.

3. A brake shoe holder, comprising a head, a key receiving housing at one longitudinal side edge thereof, a shoe removably fitted upon the head and adapted for contact with the flange of a car wheel at one side thereof, a removable key fitted in the housing and adapted for contact with the shoe at the opposite side thereof, and a grooved car wheel flange engaging enlargement at the opposite side of the head.

4. A brake shoe holder, comprising a head, a key receiving housing at one longitudinal side edge thereof, a shoe removably fitted upon the head and adapted for contact with the flange of a car wheel at one side thereof, a removable key fitted in the housing and adapted for contact with the shoe at the opposite side thereof, a grooved car wheel flange engaging enlargement at the opposite side of the head, and an abutment flange on the head adjacent to the said enlargement and adapted for contact with the shoe at one side thereof.

In testimony whereof I affix my signature in presence of two witnesses.

IRA W. BURGESS.

Witnesses:
JAMES HOWARD,
JOHN QUIGLEY.